United States Patent [19]
Hausman et al.

[11] Patent Number: 5,872,920
[45] Date of Patent: Feb. 16, 1999

[54] PROGRAMMED I/O ETHERNET ADAPTER WITH EARLY INTERRUPTS FOR ACCELERATING DATA TRANSFER

[75] Inventors: Richard Hausman, Soquel; Paul William Sherer; James P. Rivers, both of Sunnyvale; Cynthia Zikmund, Boulder Creek; Glenn W. Connery, Sunnyvale; Niles E. Strohl, Tracy; Richard S. Reid, Mountain View, all of Calif.

[73] Assignee: 3Com Corporation, Santa Clara, Calif.

[21] Appl. No.: 503,797

[22] Filed: Jul. 18, 1995

Related U.S. Application Data

[63] Continuation of Ser. No. 374,491, Jan. 17, 1995, Pat. No. 5,485,584, and a division of Ser. No. 907,946, Jul. 2, 1992, Pat. No. 5,412,782.

[51] Int. Cl.$^6$ ............................ G06F 13/00; G06F 13/32
[52] U.S. Cl. ................... 395/200.8; 395/200.66; 395/868; 370/463
[58] Field of Search ............................ 395/200, 200.2, 395/872, 868, 842, 200.8, 200.66; 370/463

[56] References Cited

U.S. PATENT DOCUMENTS

| | | | |
|---|---|---|---|
| 4,258,418 | 3/1981 | Heath | 364/200 |
| 4,590,467 | 5/1986 | Lare | 340/825.5 |
| 4,715,030 | 12/1987 | Koch et al. | 370/85 |
| 4,754,399 | 6/1988 | Yamamoto et al. | 395/250 |
| 4,768,190 | 8/1988 | Giancarlo | 370/86 |
| 4,852,088 | 7/1989 | Gulick et al. | 370/94 |
| 4,860,193 | 8/1989 | Bentley et al. | 395/250 |
| 4,907,225 | 3/1990 | Gulick et al. | 370/94.1 |
| 5,043,981 | 8/1991 | Firoozmand et al. | 370/85.1 |
| 5,101,477 | 3/1992 | Casper et al. | 395/250 |
| 5,119,374 | 6/1992 | Firoozmand et al. | 370/85.4 |
| 5,121,479 | 6/1992 | O'Brien | 395/250 |
| 5,133,062 | 7/1992 | Joshi et al. | 395/500 |
| 5,133,078 | 7/1992 | Minassian et al. | 395/800 |
| 5,136,582 | 8/1992 | Firoozmand | 370/85.1 |
| 5,195,093 | 3/1993 | Tarrab et al. | 371/3 |
| 5,210,749 | 5/1993 | Firoozmand | 370/85.1 |
| 5,210,829 | 5/1993 | Bitner | 395/250 |
| 5,235,595 | 8/1993 | O'Dowd | 370/94.1 |
| 5,247,626 | 9/1993 | Firoozmand | 395/250 |
| 5,278,956 | 1/1994 | Thomsen et al. | 395/250 |
| 5,289,579 | 2/1994 | Punj | 395/200 |
| 5,293,487 | 3/1994 | Russo et al. | 395/200 |
| 5,329,622 | 7/1994 | Belsan et al. | 395/250 |
| 5,412,780 | 5/1995 | Rushton | 395/250 |
| 5,412,782 | 5/1995 | Hausman et al. | 395/250 |
| 5,487,152 | 1/1996 | Young | 395/200.01 |

OTHER PUBLICATIONS

Tamir et al., "Design and Implementation of High–Speed Asynchronous Communication Ports for VLSI Multicomputer Nodes," ISCAS (1988).

(List continued on next page.)

*Primary Examiner*—Dinh C. Dung
*Attorney, Agent, or Firm*—Townsend and Townsend and Crew

[57] ABSTRACT

In a Local Area Network (LAN) system, an ethernet adapter exchanges data with a host through programmed I/O (PIO) and FIFO buffers. The receive PIO employs a DMA ring buffer backup so incoming packets can be copied directly into host memory when the PIO FIFO buffer is full. The adapter may be programmed to generate early receive interrupts when only a portion of a packet has been received from the network, so as to decrease latency. The adapter may also be programmed to generate a second early interrupt so that the copying of a large packet to the host may overlap reception of the packet end. The adapter may also be programmed to begin packet transmission before the packet is completely transferred from the host to the adapter, which further reduces latency. The minimal latency of the adapter allows it to employ receive and transmit FIFO buffers which are small enough to be contained within RAM internal to an Application Specific Integrated Circuit (ASIC) containing the transceiver, ethernet controller, FIFO control circuitry and the host interface as well.

5 Claims, 8 Drawing Sheets

OTHER PUBLICATIONS

Anzilotti et al., "Implementing a Non–Buffered Slave Ethernet Adapter using the Intel 82592," Intel Data Communications Focus Group (Sep. 1989).

Kwok et al., "Cut–Through Bridging for CSMA/CD Local Area Networks," IEEE Transactions on Communications, vol. 38, No. 7 (Jul. 1990).

Siegel, et al., "Overcoming Bottlenecks in High–Speed Transport Systems," IEEE (1991).

Advanced Micro Devices, "The Supernet 2 Family for FDDI –1991/1992 World Network Data Book" (1991/1992).

Advanced Micro Devices, "The Supernet 2 Family for FDDI –1991/1992 World Network Data Book" (1991), pp. iii through 2–10, 2–40, 2–49 through 2–54.

PROGRAMMED I/O ETHERNET ADAPTER WITH EARLY INTERRUPTS FOR ACCELERATING DATA TRANSFER

This application is a Continuation of application Ser. No. 08/374,491 filed Jan. 17, 1995, now U.S. Pat. No. 5,485,584 and a Division of application Ser. No. 07/907,946 filed Jul. 2, 1992, now U.S. Pat. No. 5,412,782 issued May 2, 1995.

BACKGROUND OF THE INVENTION

This invention relates to the field of local computer networks, more particularly to an Ethernet adapter providing high throughput for hosts of a network.

Local Area Networks are becoming increasingly common at the office and in industry, where networking enhances productivity by providing improved sharing of information and specialized equipment. Such networks typically consist of an expensive, high capacity server host computer serving a number of relatively less expensive type 286, 386 or 486 Personal Computers as client hosts through which individuals may access the server and specialized equipment. Each host within the network requires an interface apparatus commonly known as an adapter that performs a role intermediate of the host and network for the reception, buffering and transmission of data by the host.

Critical for the usefulness of the PC clients, which comparatively are minimally endowed with speed and memory resources, is an efficient adapter architecture that can allow network communications to proceed in parallel with other computer operations without excessively slowing those other operations. Also critical to the efficiency of the entire network is a need that the adapter have minimal latency in the reception and transmission of data. At the same time, the adapter must be economical to be suitable for accompanying inexpensive computers.

SUMMARY OF THE INVENTION

According to the invention, in a Local Area Network (LAN), a controller in a CSMA/CD (or ethernet) adapter for connecting a host computer node to the network that transfers data to and from the host through programmed I/O (PIO) with first-in-first-out (FIFO) buffers, generates interrupts before complete packets have been received from the network (early receive interrupts), so that reception of the remainder of the packet overlaps with the host computer interrupt latency. The invention reduces overall latency in a CSMA/CD network. As a further aspect of the invention, a second early interrupt may be generated during the reception of large packets so that the copying of the packet to the host may overlap the reception of the final portion of the packet. As a still further aspect of the invention, the adapter is allowed to begin packet transmission before the packet is completely transferred from the host to the adapter, which further reduces latency. The receive PIO employs direct memory access (DMA) ring buffer backup so that incoming packets can be transferred directly into host memory (DMA transferred) when the PIO FIFO buffer is full.

The minimal latency of the adapter allows the adapter to employ relatively smaller receive and transmit FIFO buffers which can be contained within RAM internal to an Application Specific Integrated Circuit (ASIC). Specifically, the ASIC may contain the transceiver, ethernet control circuitry, FIFO control circuitry, FIFO RAM buffers and the host interface in one unit. A further understanding of the nature and advantage of this invention may be realized by reference to the remaining portions of the specification and drawings.

DETAILED DESCRIPTION OF PARTICULAR EMBODIMENTS

Figure 1:
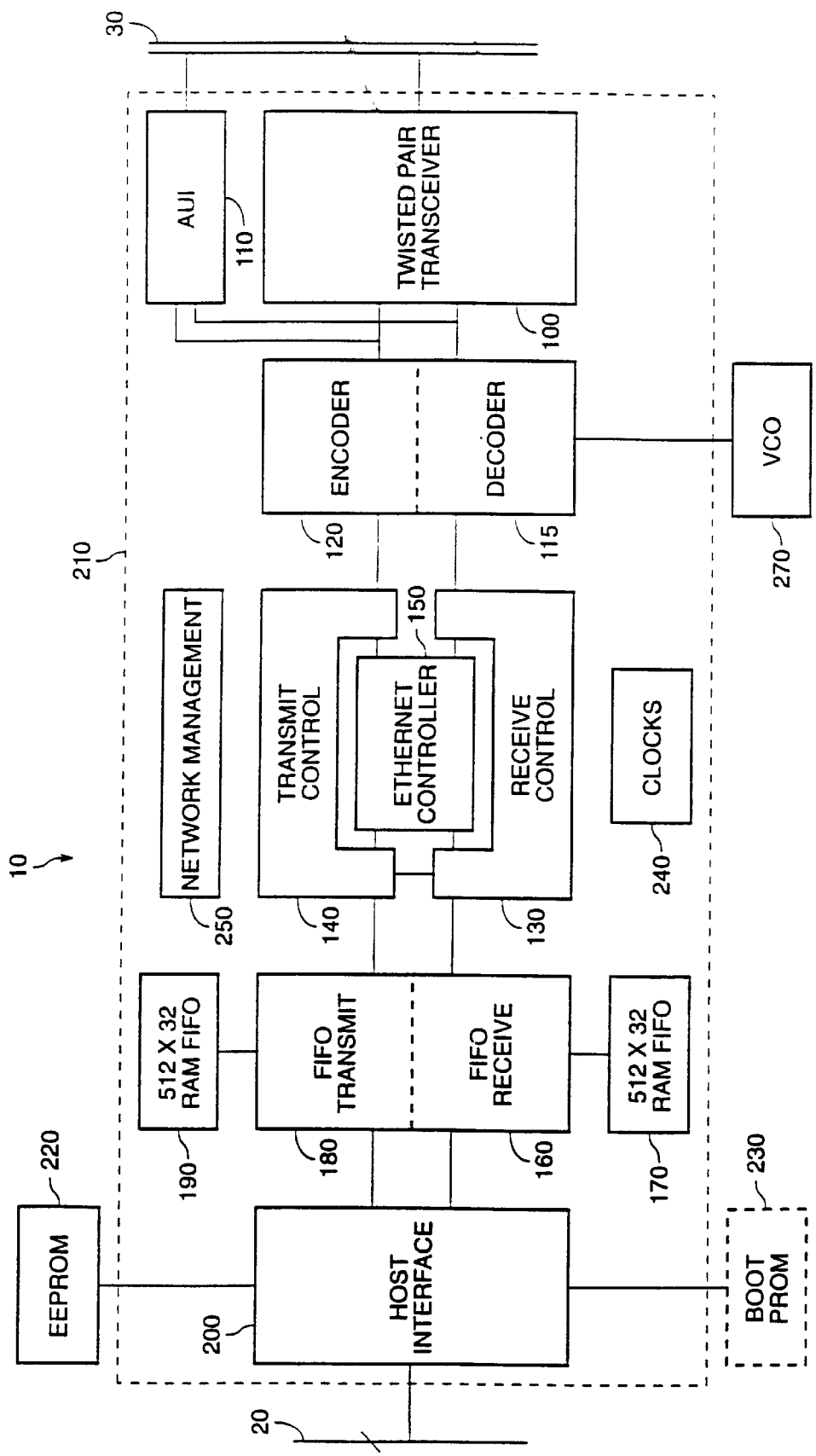
FIG. 1 is a block diagram of an ethernet adapter according to the present invention, for use with twisted pair physical media.

Referring to FIG. 1, a block diagram is shown of an adapter 10 according to the present invention for communications between a client host computer and an ethernet computer network twisted pair wires. Adapter 10 comprises a number of components coupled between a host computer system bus 20 and communications network twisted pair physical media 30. A twisted pair transceiver 100 is coupled in parallel with an Attachment Unit Interface (AUI) 110 between physical media 30 and both decoder circuitry 115 and encoder circuitry 120. Decoder circuitry 115 is coupled to receive control circuitry 130, and encoder circuitry 120 is coupled to transmit control circuitry 140. Receive control circuitry 130 and transmit control circuitry 140 are coupled to each other and are both coupled to and share ethernet control circuitry 150. Ethernet control circuitry 150 may also include an interrupt timer, explained in more detail below. Receive control circuitry 130 is coupled to receive First In First Out (FIFO) circuitry 160, which is in turn coupled to a receive (RX) RAM FIFO 170. Similarly, transmit control circuitry 140 is coupled to transmit FIFO circuitry 180, which is in turn coupled to a transmit (TX) RAM FIFO 190. Receive FIFO circuitry 160 and transmit FIFO circuitry 180 are both coupled to a host interface 200 coupled to host system bus 20. Host interface 200 also includes DMA control circuitry.

The transceiver, control circuitry, and RAM discussed thus far are shown in FIG. 1 enclosed by a dotted line to indicate that this circuitry may all be contained within a single Application Specific Integrated Circuit (ASIC) 210. ASIC 210 also employs an EEPROM 220 coupled to host interface 200 to provide configuration data such as station address, and it may also optionally employ a boot PROM 230 for automatic configuration. Also contained within and employed throughout ASIC 210 are clocks 240 and network management circuitry 250 to manage various network status signals. An external voltage controlled oscillator (VCO) 270 is also coupled to decoder 115 and encoder 120

Figure 2:
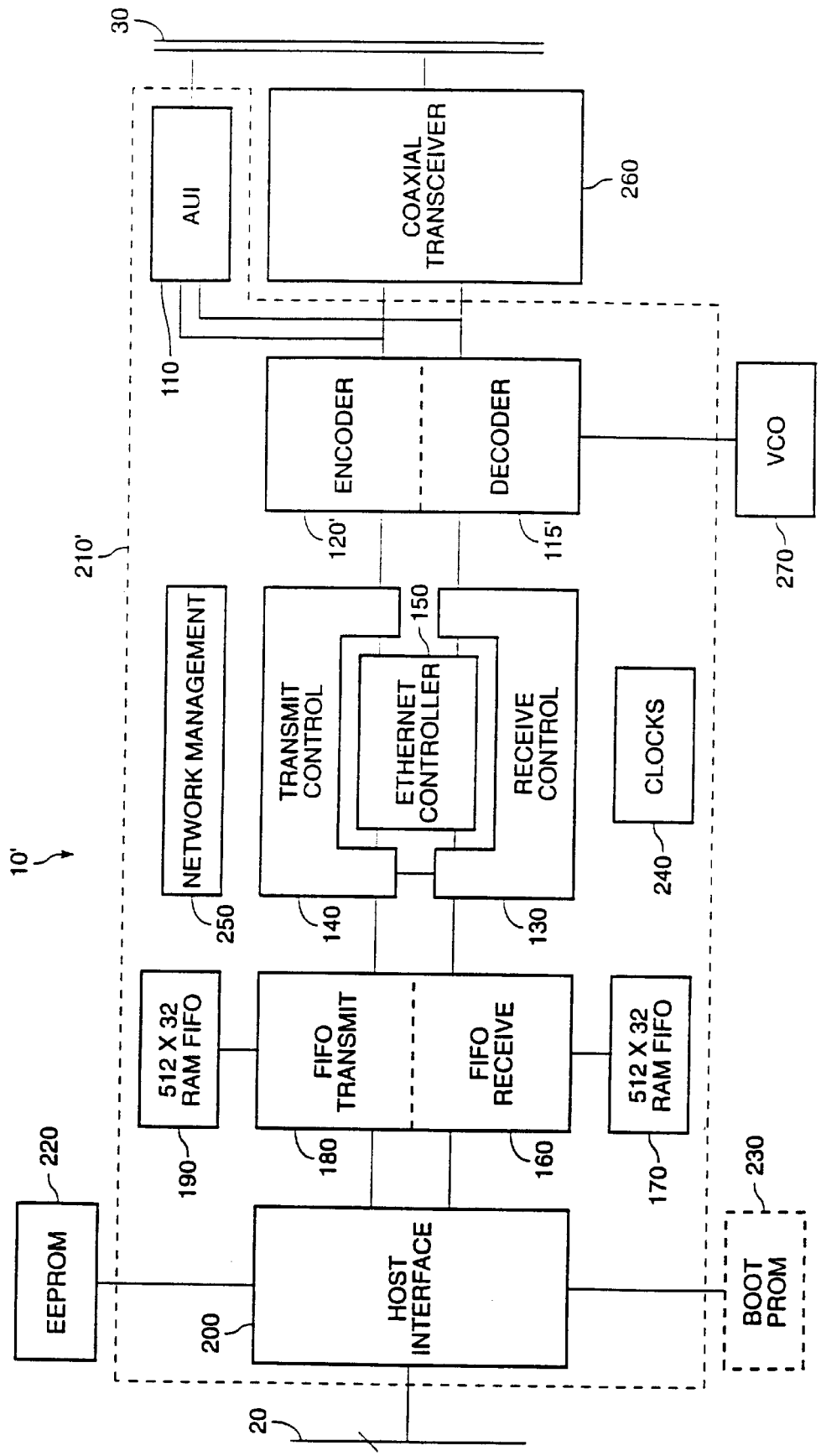
FIG. 2 is a block diagram of an ethernet adapter according to the present invention, for use with coaxial cable physical media.

An alternative configuration for an adapter 10' for networks carried by coaxial cable physical media 30' rather than twisted pair physical media 30 is illustrated in FIG. 2. Adapter 10' employs an ASIC 210' that is substantially identical to ASIC 210, except that it uses an external coaxial transceiver 260 rather than internal twisted pair transceiver 100.

Overview of Operation

All data transfer operations between adapter 10 and the host are performed preferably through programmed I/O (PIO), except that a direct memory access (DMA) mode is available as a backup for receive operations. Data is stored by the adapter as double words (4 bytes). As a data packet is received, it is copied into receive FIFO 170. An early receive threshold size is established so that any packet larger than a preselected size triggers the early receive interrupt. If adapter 10 is not provided with or programmed for early receive interrupts, or if the packet is smaller than the early receive threshold size, adapter 10 will wait until the entire packet has been received and then generate an interrupt indicating that a complete packet has been received, that is, a receive complete interrupt, to signal a driver that a complete packet is available for reading. If adapter 10 is provided with or programmed for early interrupts at a particular early receive threshold, an early receive interrupt will be generated once that number of bytes have been received. The driver may then begin reading the data, or for long packets may reprogram the early receive threshold to generate another early receive interrupt once more of the packet has been received.

As a protection against overflow of the receive FIFO, called receive FIFO overrun, a DMA backup mode may be enabled. If the driver is unable to service receive FIFO 170 adequately, such as if other interrupt handlers consume excessive CPU time, DMA backup will be initiated once receive FIFO 170 has less than a receive FIFO free byte threshold number of remaining available bytes. During DMA mode, data is copied directly from the top of receive FIFO 170 into a DMA ring buffer in the host computer memory.

For transmit operations, all data must be moved into transmit FIFO 190 by the driver through PIO. Typically the driver will copy as much of the packet to the adapter as possible. To minimize latency according to the invention, the adapter may begin transmitting the packet before the complete packet has been copied into transmit FIFO 190. If one or more earlier packets yet remain in transmit FIFO 190, there may be insufficient space for the current packet to be completely copied into transmit FIFO 190. In such a case, the driver will set a threshold to indicate that the transmit function is available, called a TX available threshold, specifying a number of bytes to request an interrupt from adapter 10 when the required number of bytes are free in transmit FIFO 190.

Figure 3A:
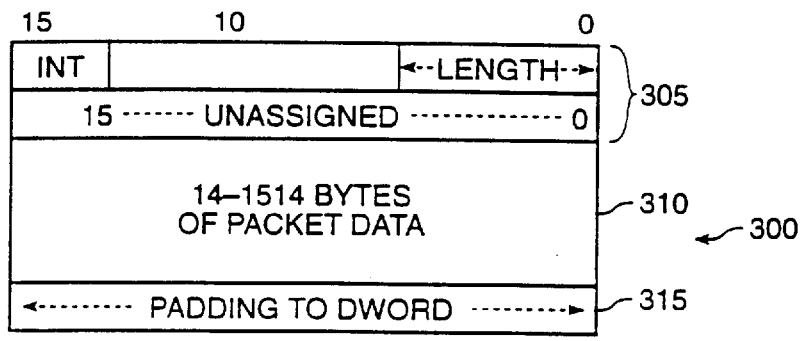
FIGS. 3A and 3B illustrate the structure of transmit data packets and receive data packets, respectively, of a particular embodiment.
Figure 3B:
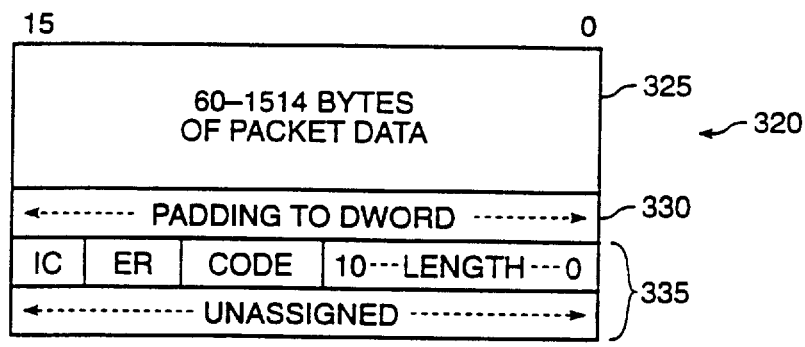

The structure of a specific embodiment of the data packets handled by adapter 10 is illustrated in FIGS. 3A and 3B. FIG. 3A illustrates a transmit packet 300 containing a four-byte preamble 305, 14 to 1514 bytes of packet data 310 (which includes destination and source addresses), and padding 315, which is for extending the length of the data string up to a double word boundary. Preamble 305 contains a 1-bit INT field which specifies whether there should be an interrupt upon successful complete transmission, and an 11-bit length field which specifies the number of bytes of actual unpadded packet data plus two bytes of data reserved for use in a future protocol. Prior to transmission of the packet, preamble 305 is stripped off and replaced with a standard 802.3 preamble.

FIG. 3B illustrates a receive packet 320 as stored in both RX FIFO 170 and in the DMA Ring Buffer if used. Packet 320 contains 60 to 1514 bytes of packet data 325 followed by padding 330 to a double word boundary, followed by a postamble 335. Postamble 335 contains two one-bit flags IN and ER, a three-bit code field, and an 11-bit length field which specifies the number of bytes of actual packet data. The IN flag specifies whether the packet is incomplete. The ER flag indicates whether there was an error in the reception, in which case the code field specifies the type of error. These sixteen bits of the postamble duplicate the RX Status register, described below, and for that reason some embodiments could omit the postamble.

Adapter Control by Driver

Adapter 10 contains numerous registers, some of which may be read by the driver to ascertain the status of adapter 10, others of which may be written to by the driver as commands to control adapter 10, and yet others which are simply used internally by the adapter. In a particular embodiment, these registers are accessed by the driver through a number of eight-word register windows. This method of register access is simply a design choice not critical to the invention, and indeed, many of the commands and registers are not important for an understanding of the invention and need not be described.

Figure 3C:
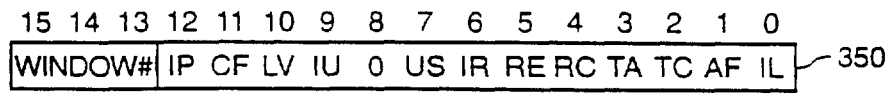
FIGS. 3C, 3D, and 3E illustrate the structure of the adapter status register, the receive status register, and the transmit status register, respectively, of a particular embodiment.

One of the primary registers of adapter 10 is the adapter status register, as illustrated in FIG. 3C and indicated generally by reference numeral 350. Its individual bits are briefly described below. Bits marked with an asterisk (*) cause an interrupt when set, unless masked off.

| | |
|---|---|
| Bit 0 | Interrupt Latch-- latched when the adapter raises an interrupt to the host; cleared when acknowledged. |
| Bit 1 | *Adapter Failure |
| Bit 2 | *TX Complete-- the adapter has finished transmitting a packet. |
| Bit 3 | *TX Available-- the number of bytes in the TX FIFO now exceeds the TX Available Threshold. |
| Bit 4 | *RX Complete-- there is a complete packet available in either the RX FIFO or in the host DMA ring buffer. |
| Bit 5 | *RX Early-- more than the RX early threshold, but not all, bytes of the current packet have been received. |
| Bit 6 | *Interrupt Requested-- set when the driver commands the adapter to generate an interrupt. |
| Bit 7 | *Update Statistics-- used for statistics tracking. |
| Bit 8 | (Always zero) |
| Bit 9 | host DMA ring buffer In Use-- indicates the host DMA ring buffer is not empty. |
| Bit 10 | host DMA ring buffer Last Valid-- explained below. |
| Bit 11 | (Reserved) |
| Bit 12 | Command In Progress-- the last command is still being processed by the adapter. |
| Bits 13–15 | Window Number (0–7) |

Figure 3D:
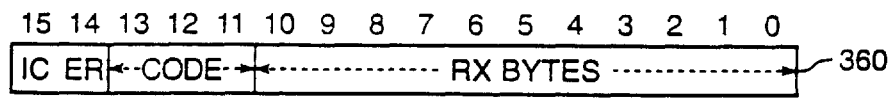

There are also individual status registers for the receive and transmit FIFOs. The RX status register, as illustrated in FIG. 3D and indicated generally by reference numeral 360, contains two one-bit flags, IC and ER, a three-bit error code, and an 11-bit field, called RX Bytes, containing the receive packet length, which can range from 0 to 1514. References below to RX Bytes should be understood to be to the value contained in the RX Bytes field. Flag IC indicates that the top packet is incomplete or that RX FIFO 170 is empty. Flag ER indicates an error occurred, the type of which is specified in the code field. RX status register 360 is a ripple through FIFO that advances one position when the last byte of a received packet is read from RX FIFO 170. A packet becomes visible in RX status register 360 once either the minimum of 60 bytes have been stored in RX FIFO 170 or the RX Early Threshold has been exceeded. If an error is signalled in the packet before this point, the packet is discarded. If an error occurs after this point, the packet's status will appear in RX status register 360 flagged with an error.

As the packet is received into RX FIFO 170, RX Bytes is incremented. Once the packet has been completely received, the postamble, described above, is written to RX FIFO 170. If the packet is not read from RX FIFO 170 until the incomplete bit is cleared, RX Bytes will show the packet length (assuming there were no errors). As bytes of a packet are read from RX FIFO 170, RX Bytes is decremented. This can be done before the packet has been completely received, in which case RX Bytes shows the number of packet bytes stored in RX FIFO 170. When reading past the end of the packet data, into the postamble, the value RX Bytes is decremented to negative numbers. Reading packet bytes from RX FIFO 170 prior to complete packet reception can be initiated after an initial early receive interrupt through either programming a second early receive interrupt or by simply waiting a period time after the first interrupt. It should also be noted that at any time the driver can issue an RX discard command and the packet will be discarded from RX FIFO 170.

Figure 3E:
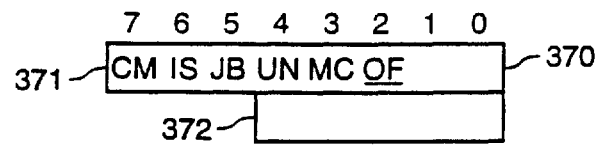

The TX status register, illustrated in FIG. 3E and indicated generally by reference numeral 370, is treated as if stacked in a similar manner to the RX status register. However, it is actually implemented as a pseudo-stack comprising a register of status flags 371 and a five bit counter 372, as opposed to a true stack of status flag registers. The use of such a pseudo-stack is possible because transmission stops upon any transmission error, and does not resume until the error status is popped from the status register. Any sequence of N transmissions would therefore be a string of N–1 successful transmissions followed by the Nth transmission which may or may not have been successful. Status flags 371 store the status of the Nth transmission, and counter 372 stores N, the number of transmissions in the stack. At a new packet transmission the adapter increments counter 372 and updates flags 371 as necessary. Popping TX status register 370 results in counter 372 being automatically decremented. When the contents of TX status register 370 are accessed, if the count is greater than one, then the regular successful status bits are forced on the bus. If the count is equal to one, then the contents of status flags 371 are applied to the bus, indicating the status of the most recent transmission. If the count is equal to zero, then TX status register 370 is indicated as being empty by applying zeros to the bus.

The flags 371 are a transmission complete flag, a flag specifying whether an interrupt should be generated on successful completion of transmission, and several error flags. Whenever the driver reads TX status register 370 and the TX completed bit is set, the stack is popped, and the next TX status may be read, if any. Popping everything off this stack turns off the TX Complete interrupt bit in adapter status register 350, described above. When the completion of a packet is signalled to the host, the packet has already been discarded from TX FIFO 190. If an error occurred and the packet needs to be retransmitted, it must be copied to TX FIFO 190 again. If the error occurred while the packet was still being copied to the adapter, the host should continue copying the packet to the adapter. When completely copied to the adapter, the packet will be discarded.

Packet Transmission

Figure 4A:
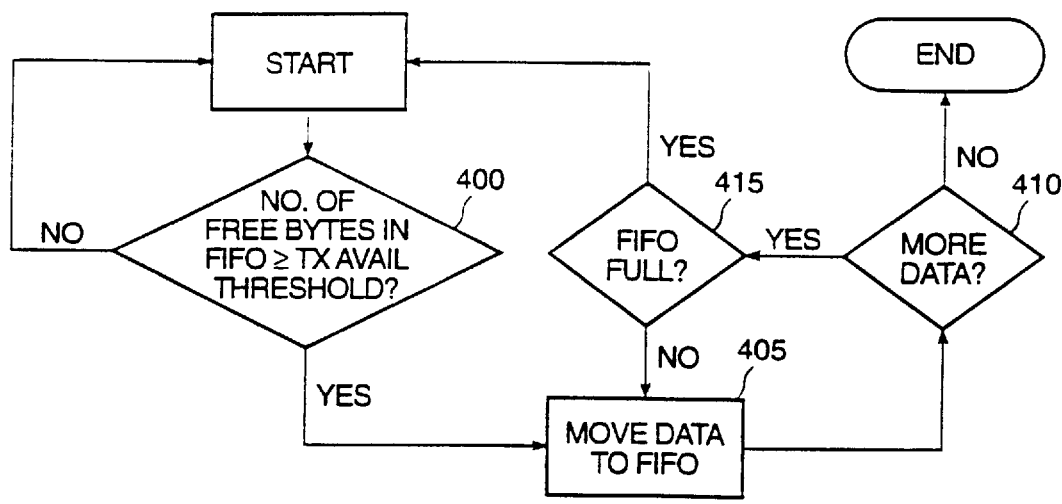
FIG. 4 is a flow chart illustrating the transmit process with early transmit interrupts.
Figure 4B:
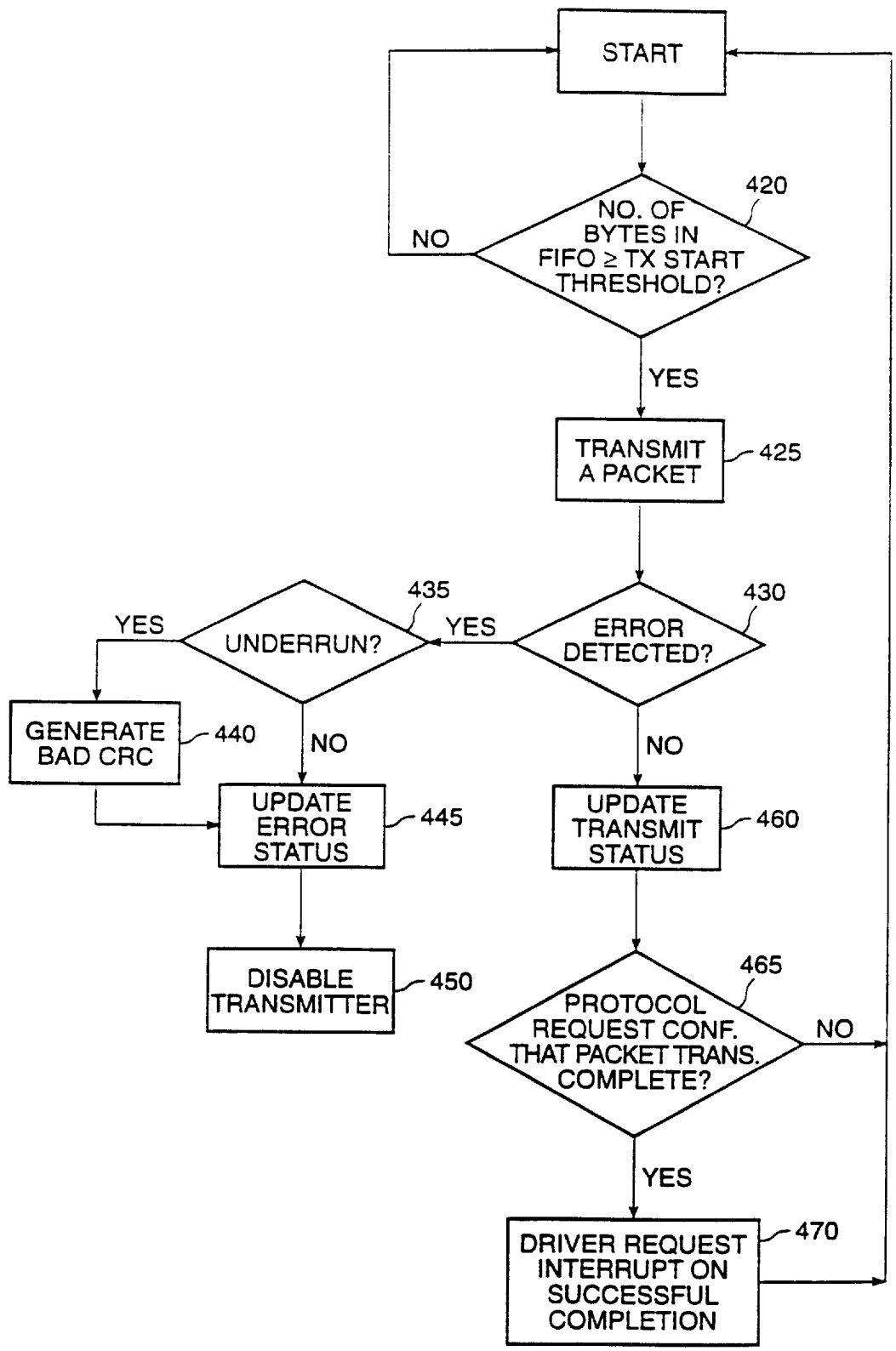

The basic transmission procedure is performed by the adapter as two independent processes, illustrated by the flow charts of FIGS. 4A–B. FIG. 4A illustrates the process performed by the driver when there is packet data to be copied to the adapter, and FIG. 4B illustrates the process performed by the adapter when transmitting packets on the physical medium. As shown in FIG. 4A, the driver first compares at step 400 the number of free bytes in TX FIFO 190 against a TX available threshold. This comparison may be done by polling by the driver, or a TX Available Threshold command may be performed so that the adapter will issue an interrupt when the TX Available Threshold is met. Control remains at this comparison until the TX Available Threshold is met. When the TX Available Threshold is met, control passes to step 405, at which a block of data is copied by the driver into TX FIFO 190. Next, at step 410, it is determined if more data remains to be copied to the adapter. If not, the process ends until the driver has more packet data to be copied to the adapter. If more data remains, control proceeds to step 415, at which TX FIFO 190 is examined to determine if it is full. If TX FIFO is not full, control passes again to step 405. Otherwise, control returns to step 400. If the packet length specified in packet preamble 305 is less than 60 bytes, the adapter will pad the packet to the 60 byte minimum. Multiple packets can be stored in TX FIFO 190 by employing the process of FIG. 4A.

FIG. 4B illustrates the process by which packets are transmitted from TX FIFO 190 to the physical medium. In step 420 it is determined if the number of bytes in TX FIFO 190 is at least equal to a TX start threshold. The TX start threshold may be varied by the driver to reduce the likelihood of transmit underruns. Control remains at this step until the TX start threshold is met, at which time control passes to step 425. At step 425 the adapter begins to transmit a packet from TX FIFO 190 and continues until the entire packet has been transmitted or an error has occurred, at which point control passes to step 430. At step 430 it is determined if an error was detected during transmission. If so, control passes to step 435 at which it is determined if the error was an underrun error. If the error was an underrun error, then a "bad" CRC is intentionally generated at step 440. If the error was not an underrun, or after a bad CRC is generated, control passes to step 445 where the error status is updated, and next to step 450 where the transmitter is disabled. If at step 430 no error was detected, control passes from there to step 460, at which the transmit status is updated. Next, at step 465, the software protocol (driver) is checked to determine if whether an acknowledgement that packet transmission is complete is required. If not, control returns to start again at the loop of step 420 to await transmission of the next packet. If an acknowledgement is required, at step 470 the driver requests from the adapter an interrupt on successful completion of the next packet transmission, after which control passes to the loop of step 420.

Transmission underruns are generally the result of high interrupt latencies, which are beyond the control of the driver. If a packet underruns, the driver may want to guarantee that the retransmitted packet will not underrun again. This can be done by adjusting the TX start threshold to an amount larger than the packet, so transmission will not begin until the packet is completely copied into the adapter.

A programmable TX Available Threshold is provided by the driver to the adapter to cause the adapter to generate an interrupt when the specified number of bytes become available in TX FIFO 190. This allows the driver to return and continue copying the data into the adapter at a later time when some of the data in TX FIFO 190 has been transmitted. If TX Available is used with a specified amount less than the size of the next packet to be transmitted, and only a portion of the packet is copied into TX FIFO 190, the driver may want to adjust the early TX threshold to larger than that portion of the packet, to prevent an underrun. This decision may be based upon whether the size of the packet portion in TX FIFO 190 is larger than the amount that can be transmitted during the expected interrupt latency.

Packet Reception by Adapter

Figure 5:
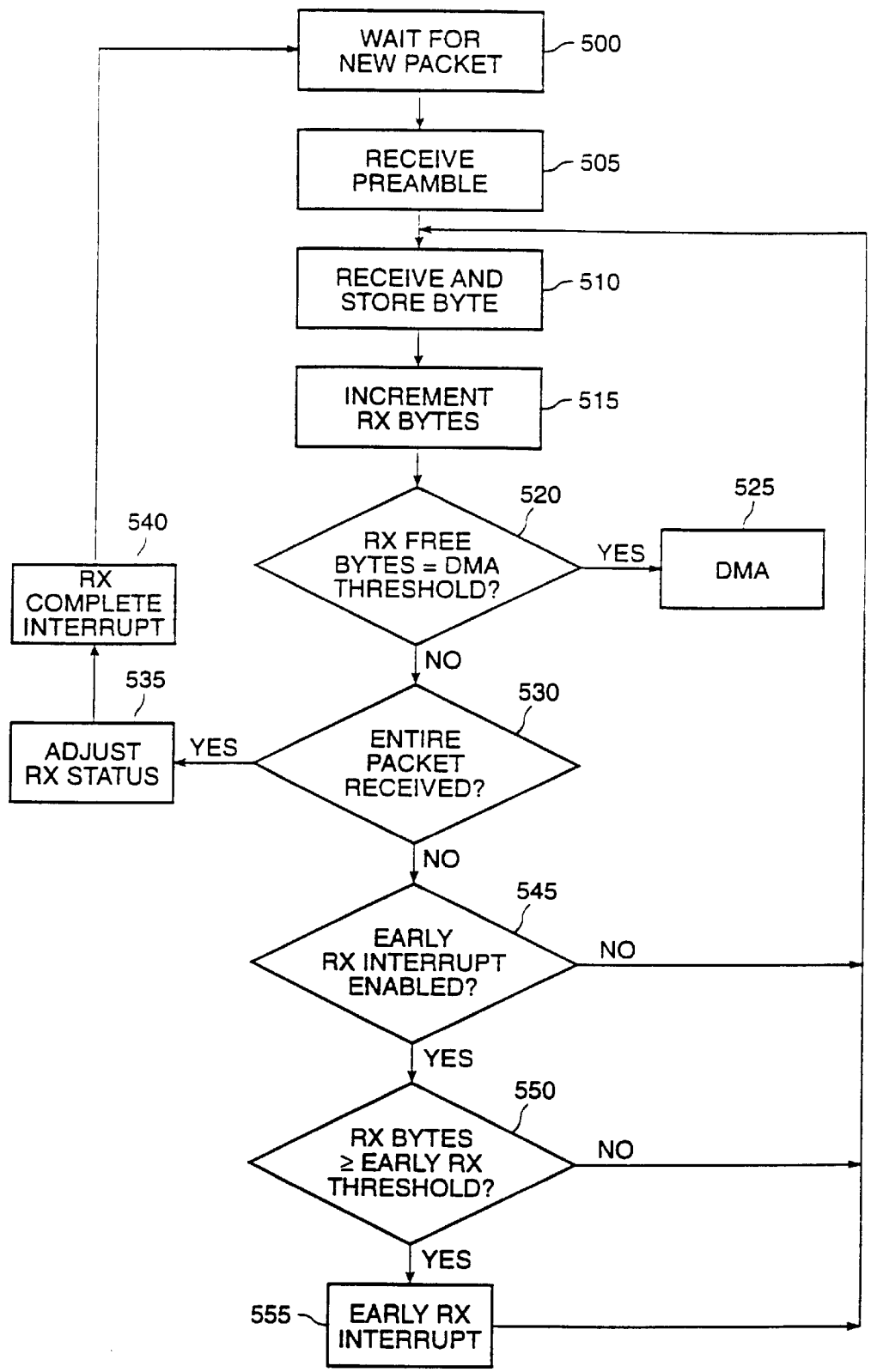
FIG. 5 is a flow chart illustrating the adapter receive process with early receive interrupts.

Illustrated by the flow chart of FIG. 5 is the basic receive procedure performed by the adapter. The process begins in step 500, where the adapter waits for the beginning of a new packet to be received, after which control passes to step 505. In step 505 the packet 802.3 preamble is received and then discarded by the controller. Next, in step 510 the next byte of the packet is received and stored in RX FIFO 170, after which RX Bytes is incremented in step 515. As mentioned above, the partially received packet, and its associated status values, will not become visible to the driver until RX Bytes reaches the sixty byte minimum or exceeds the RX Early Threshold.

Subsequently, in step 520, if DMA backup is enabled, RX Free, the number of free bytes remaining in RX FIFO 170, is compared to the DMA threshold. If insufficient bytes remain in free, then control passes to step 525, where the DMA process is begun (described in more detail below). If sufficient bytes remain, control passes to step 530.

At step 530 it is determined whether the entire packet has been received. If so, execution passes to step 535, where the RX status register is adjusted accordingly, after which an RX Complete interrupt is generated in step 540 before returning to step 500. If the entire packet had not been received at step 520, execution passes to step 545, where the Early RX interrupt enablement is examined. If not enabled, control returns to step 510 to receive more of the packet. If Early RX interrupts are enabled, then control passes from step 545 to step 550, at which RX Bytes is compared to the Early RX threshold. If RX Bytes is less than the Early RX threshold, then control returns to step 510. Otherwise, control passes to step 555 at which an Early RX interrupt is generated to signal the driver that it may begin copying the packet to the host. After step 555, control returns to step 510.

DMA Backup During Receive

DMA backup of PIO copying of data from RX FIFO 170 to the host is advantageous because the host CPU may become overly delayed by other interrupts and unable to service RX FIFO 170 quickly enough. The DMA backup employs a DMA Ring Buffer consisting of a contiguous block of memory between 256 and 16 K bytes in length, located in the host memory and accessed through system bus 20. The DMA circuitry, contained within host interface 200, is set up once during initialization, if DMA backup is selected, to access a DMA channel to the DMA ring buffer in host memory. The DMA channel is programmed to transfer data into the receive ring in a manner causing it to automatically wrap around at the end of the DMA ring buffer space. Packets stored in the DMA ring buffer have the same structure as those in RX FIFO 170.

If DMA mode is initiated, the DMA controller will begin copying bytes from the top of RX FIFO 170 into the DMA ring buffer, while receive circuitry 130 may be continuing to add data to the bottom of RX FIFO 170. The DMA controller preferably copies bytes into the DMA ring buffer at a slightly faster rate than receive circuitry 130 adds bytes to RX FIFO 170. Three registers are maintained to provide necessary information to the driver: the host DMA ring buffer Read index, the host DMA ring buffer Write index, and the host DMA ring buffer Last index. The host DMA ring buffer Read index specifies the address of the next byte to be read from the DMA ring buffer by the driver. This register is only writable by the driver and must be maintained by it. The host DMA ring buffer Write index specifies the address to which the next byte will be written by the DMA controller. If the host DMA ring buffer Read index equals the host DMA ring buffer Write index, the DMA ring buffer is empty. A full condition is reached when the host DMA ring buffer Write index comes sufficiently close to the host DMA ring buffer Read index that the next DMA transfer (typically a burst of four or eight bytes) would cause the two to collide on the network. The host DMA ring buffer Last index specifies the address of the last receive packet postamble copied into the DMA ring buffer. Normally, no more than one complete packet would be present in the DMA ring buffer, although the host DMA ring buffer Last index, together with the length specified in the pointed-to postamble, can be used to trace through a series of packets in the DMA ring buffer. It should be noted that operations involving DMA ring buffer addresses should be performed modulo the DMA ring buffer size, so as to properly wrap around at the DMA ring buffer space limits.

Copying of Received Data by Driver

When the driver responds to a Receive Complete interrupt or an Early Receive interrupt, it first checks the host DMA ring buffer In Use bit of the adapter status register. If the DMA ring buffer is in use, the driver should first empty the DMA ring buffer before disabling DMA and then servicing RX FIFO 170.

Otherwise, if the DMA ring buffer is not in use and the driver is responding to a Receive Complete interrupt for a valid packet, it simply begins copying the packet to the host. A packet with an error is discarded.

Figure 6:
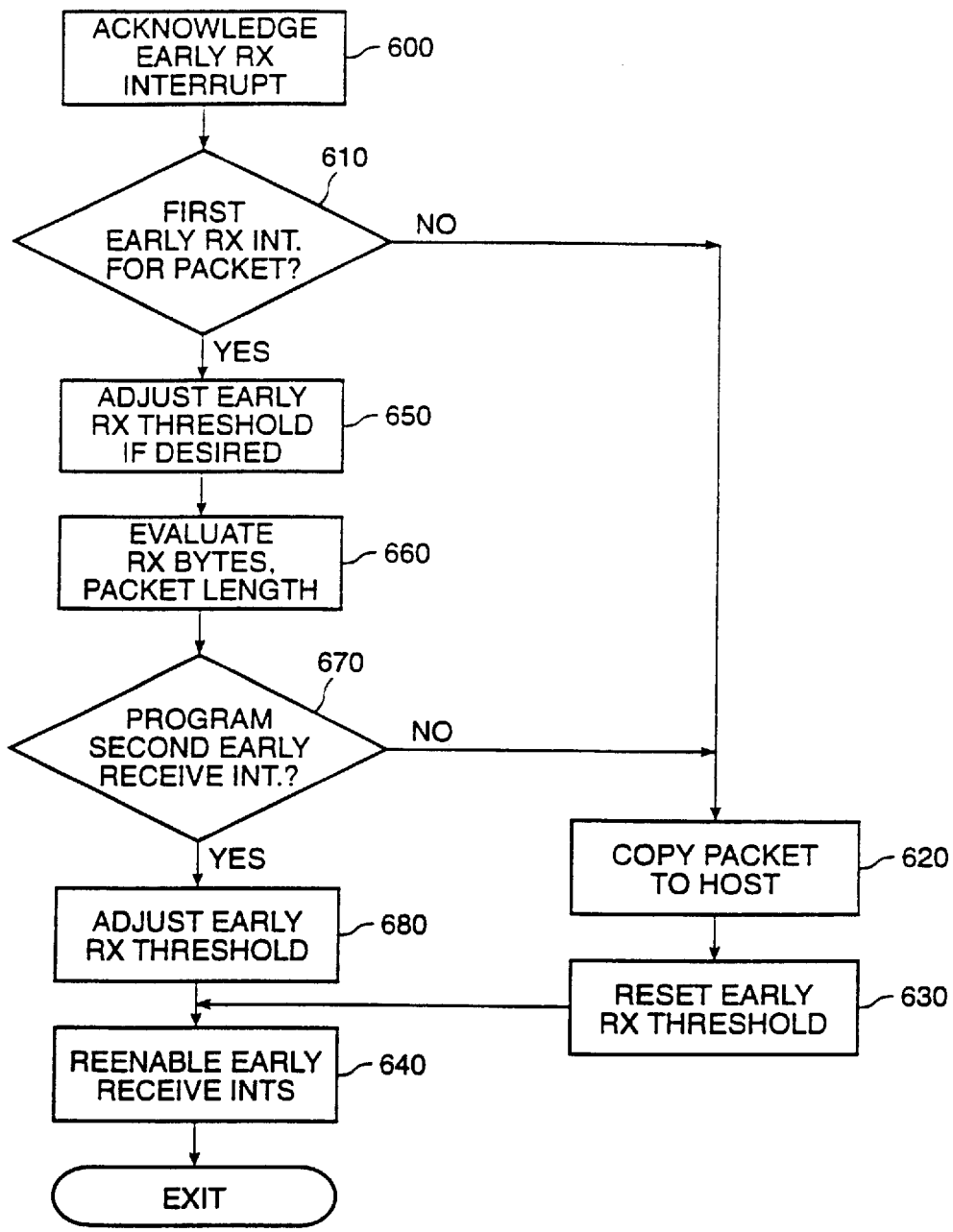
FIG. 6 is a flow chart illustrating the driver process in response to an early receive interrupt.

If the driver is responding to an Early Receive interrupt, it follows the procedure illustrated by the flow chart of FIG. 6. In step 600 the Early Receive interrupt is acknowledged, which disables further Early Receive interrupts. Next, in step 610, it is determined if this is the first Early Receive interrupt for this packet. This can be done by comparing the adapter's Early Receive threshold to an Early Receive threshold value maintained by the driver. If the latter is smaller, then the adapter had been programmed for a second Early Receive interrupt for this packet, in which the packet should be ready for copying to the host, and control passes to step 620. After the packet is copied to the host in step 620, control proceeds to step 630, where the Early Receive threshold is reset to the value maintained by the driver. Next, Early Receive interrupts are re-enabled in step 640, and the driver exits.

If in step 610 it was indicated that this was the first Early Receive interrupt for this packet, control passes to step 650. If the host computer protocol allows early packet indications, then in step 650 the driver compares RX Bytes to the early lookahead size of the protocol to determine if the Early Receive threshold properly accounts for the CPU's interrupt latency. If the two compared values differ by a significant amount, the Early Receive threshold is adjusted accordingly, and at this point the early lookahead portion of the packet is copied to a dedicated early lookahead buffer for the protocol. The interrupt timer incorporated into ethernet control circuitry 150 may instead be used to determine whether the Early Receive threshold should be adjusted (and may be used to determine a need for similar adjustments to the Early Transmit interrupt). Next, in step 660, RX Bytes is compared to the packet length specified in the RX Status register. If the packet has a substantial number of bytes remaining to be received, such that the driver would empty RX FIFO 170 significantly before the last portion of the packet was completely received, in step 670 it is determined to program the adapter for a second Early Receive interrupt, and control passes to step 680. In step 680 the adapter is programmed for an Early Receive threshold equal to the length of the packet less the number of bytes that would be received during the interrupt latency. After step 680, execution passes to step 640, described above.

The invention has now been explained with reference to specific embodiments. Other embodiments will be apparent to those of ordinary skill in the art. It is therefore not intended that this invention be limited, except as indicated by the appended claims.

What is claimed is:

1. A method of transferring a packet of data from a computer network communications media through an adapter to a host computer, said method comprising the steps of:
   a. receiving from said communications media through a transceiver and storing in an adapter receive buffer a predetermined first receive threshold number of bytes of said packet;
   b. thereupon generating a first early receive interrupt from said adapter to said host computer;
   c. thereafter reading a first portion of a packet less than all of said packet and presenting said first portion to said host computer; and
   d. thereafter receiving from said communications media through said transceiver and storing in said adapter receive buffer a remainder of said packet, wherein said host computer employs a driver allowing for early indications and having an early lookahead size, and wherein said step of receiving a predetermined first receive threshold number of bytes comprises receiving a number of bytes substantially equal to said early lookahead size and wherein said early lookahead size number of bytes is read by said host computer's CPU to determine further handling of said packet by analyzing said early indications.

2. The method of claim 1, wherein said adapter and said host computer together have an interrupt latency time, said method further comprising after said step of receiving a predetermined first receive threshold number of bytes, the step of continuing to receive from said communications media through said transceiver and store in an adapter receive buffer bytes of said packet, wherein said step of receiving a predetermined first receive threshold number of bytes comprises receiving a predetermined first receive threshold number of bytes substantially equal to said early lookahead size less a predetermined data receive rate times said interrupt latency time.

3. The method of claim 2, further comprising, after the step of generating said first interrupt, the steps of
   a) evaluating the number of bytes stored in said adapter receive buffer against said early lookahead size; and
   b) adjusting said receive threshold if said evaluating step does not indicate substantial equality.

4. A method of transferring a packet of data from a computer network communications media through an adapter to a host computer, said method comprising the steps of:
   a. receiving from said communications media through a transceiver and storing in an adapter receive buffer a predetermined first receive threshold number of bytes of said packet;
   b. thereupon generating a first early receive interrupt from said adapter to said host computer;
   c. thereafter reading a first portion of a packet less than all of said packet and presenting said first portion to said host computer; and
   d. thereafter receiving from said communications media through said transceiver and storing in said adapter receive buffer a remainder of said packet wherein said packet comprises a preamble specifying a length of said packet in bytes, said method further comprising after said step of generating a first early receive interrupt and before said step of receiving a remainder of said packet, the steps of:
   e. adjusting said receive threshold according to said length of said packet;
   f. continuing to receive from said communications media through said transceiver and store in an adapter receive buffer bytes of said packet; and
   g. thereafter generating a second early receive interrupt from said adapter to said host computer, prior to complete reception of said packet.

5. A method of transferring through an adapter packets of data between a host computer and a computer network communications media, said method comprising the steps of:
   a. receiving from said communications media through said transceiver and storing in an adapter receive buffer a predetermined first receive threshold number of bytes of a first packet;
   b. thereupon generating a first early receive interrupt from said adapter to said host computer;
   c. receiving from said communications media through said transceiver and storing in said adapter receive buffer a remainder of said first packet;
   d. transferring from said host computer and storing in an adapter transmit buffer an early transmit threshold number of bytes of a second packet;
   e. thereupon initiating transmission of said second packet through said transceiver from said adapter transmit buffer to said computer network communications media;
   f. receiving from said host computer and storing in said adapter transmit buffer a remainder of said second packet, at least partially in parallel with transmitting said second packet through said transceiver from said adapter transmit buffer to said computer network communications media, wherein each packet comprises a preamble specifying a length of said each packet in bytes, said method further comprising after said step of generating a first early receive interrupt and before said step of receiving a remainder of said first packet, the steps of:
   g. adjusting said receive threshold according to said length of said first packet;
   h. continuing to receive from said communications media through said transceiver and store in an adapter receive buffer bytes of said first packet; and
   i. generating a second early receive interrupt from said adapter to said host computer prior to complete reception of said first packet.

* * * * *

UNITED STATES PATENT AND TRADEMARK OFFICE
CERTIFICATE OF CORRECTION

PATENT NO. : 5,872,920                        Page 1 of 1
APPLICATION NO. : 08/503797
DATED : February 16, 1999
INVENTOR(S) : Hausman et al.

It is certified that error appears in the above-identified patent and that said Letters Patent is hereby corrected as shown below:

On the Title Page, Item [63] should read,

Item [63]   Continuation of Ser. No. 374,491, Jan. 17, 1995, Pat. No.
5,485,584, which is a division of Ser. No. 907,946, Jul. 2, 1992.
Pat. No. 5,412,782.

Column 1, lines 5-8, delete "This application is a Continuation of application Ser. No. 08/374,491 filed Jan. 17, 1995, now U.S. Pat. No. 5,485,584 and a Division of application Ser. No. 07/907,946 filed Jul. 2, 1992, now U.S. Pat. No. 5,412,782 issued May 2, 1995" and insert --This application is a Continuation of application Ser. No. 08/374,491 filed Jan. 17, 1995, now U.S. Pat. No. 5,485,584 which is a Division of application Ser. No. 07/907,946 filed Jul. 2, 1992, now U.S. Pat. No. 5,412,782 issued May 2, 1995.--

Signed and Sealed this

Thirteenth Day of July, 2010

David J. Kappos
*Director of the United States Patent and Trademark Office*